Nov. 3, 1970 R. D. LE CLAIR ET AL 3,537,323
HOVER-ALTITUDE PERFORMANCE INDICATOR FOR A HELICOPTER
Filed Sept. 11, 1968 2 Sheets-Sheet 1
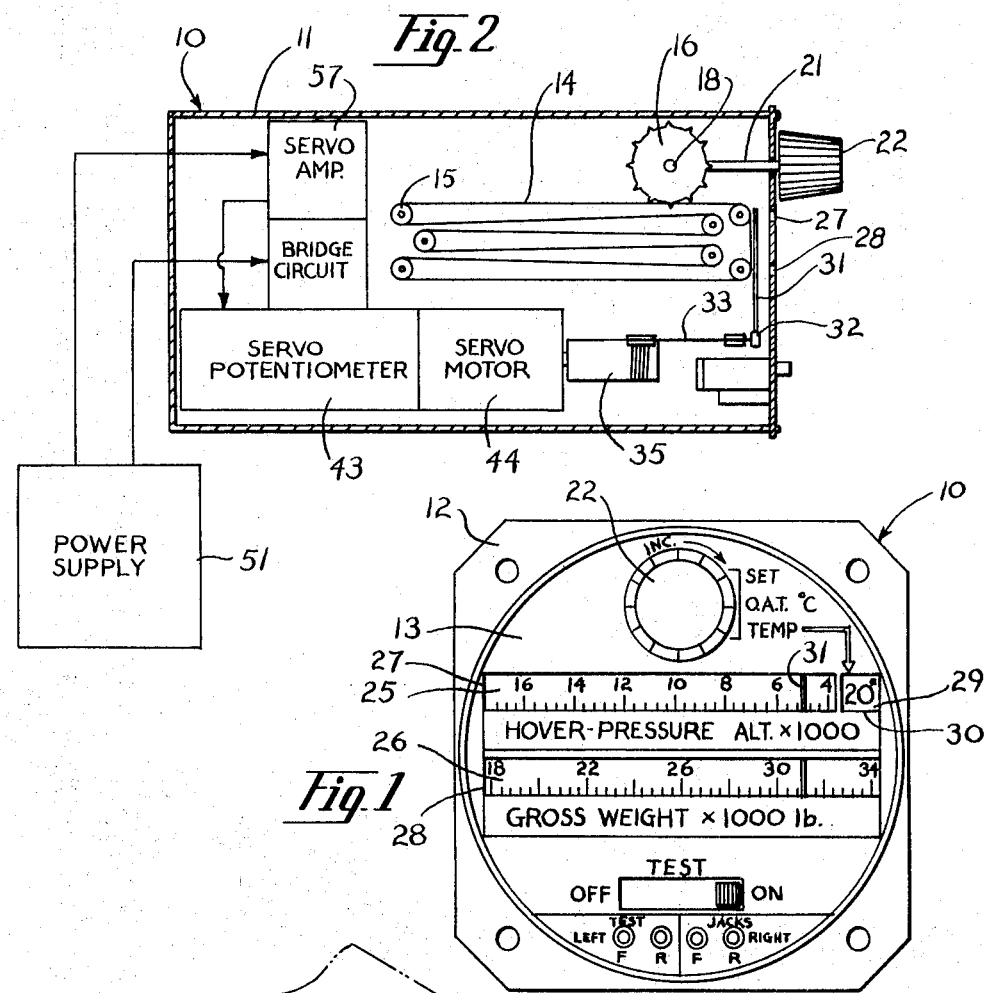
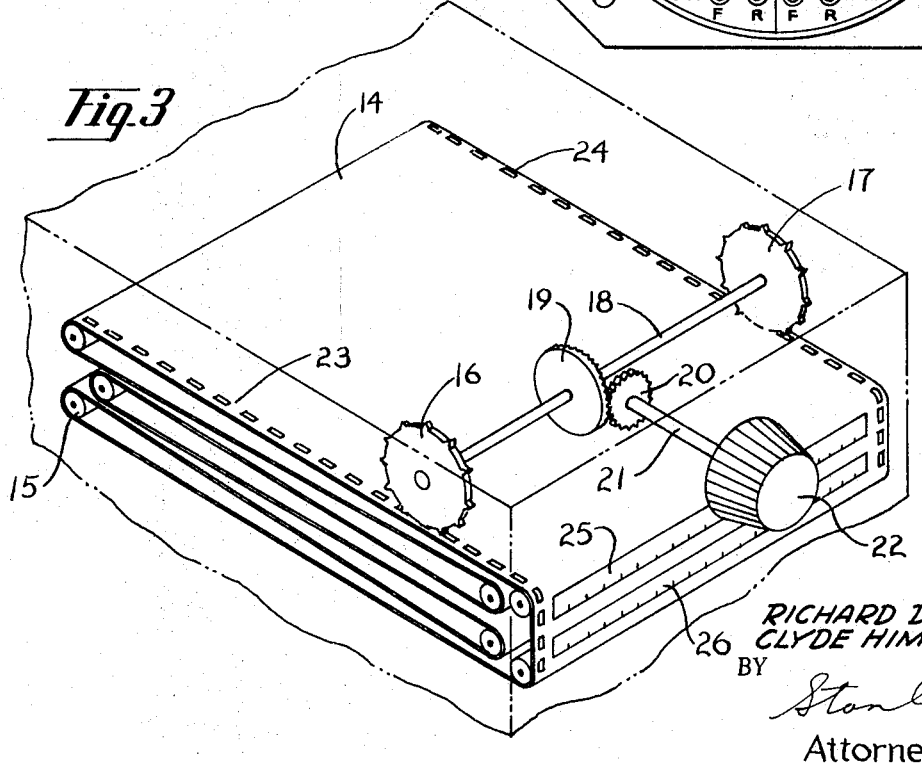
INVENTORS
RICHARD D. LECLAIR
CLYDE HIMMELSBACH
BY
Stanley Bialos
Attorney

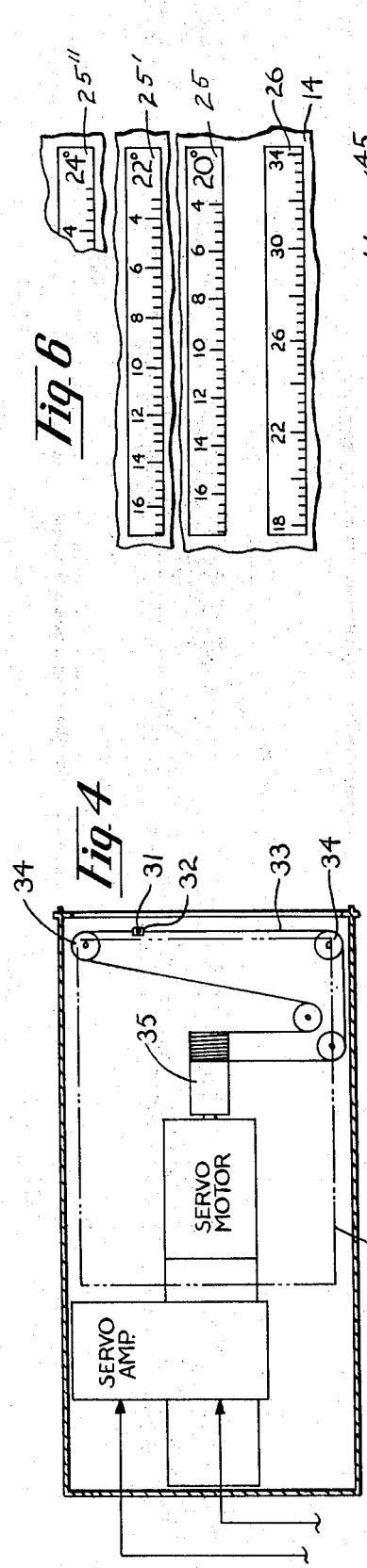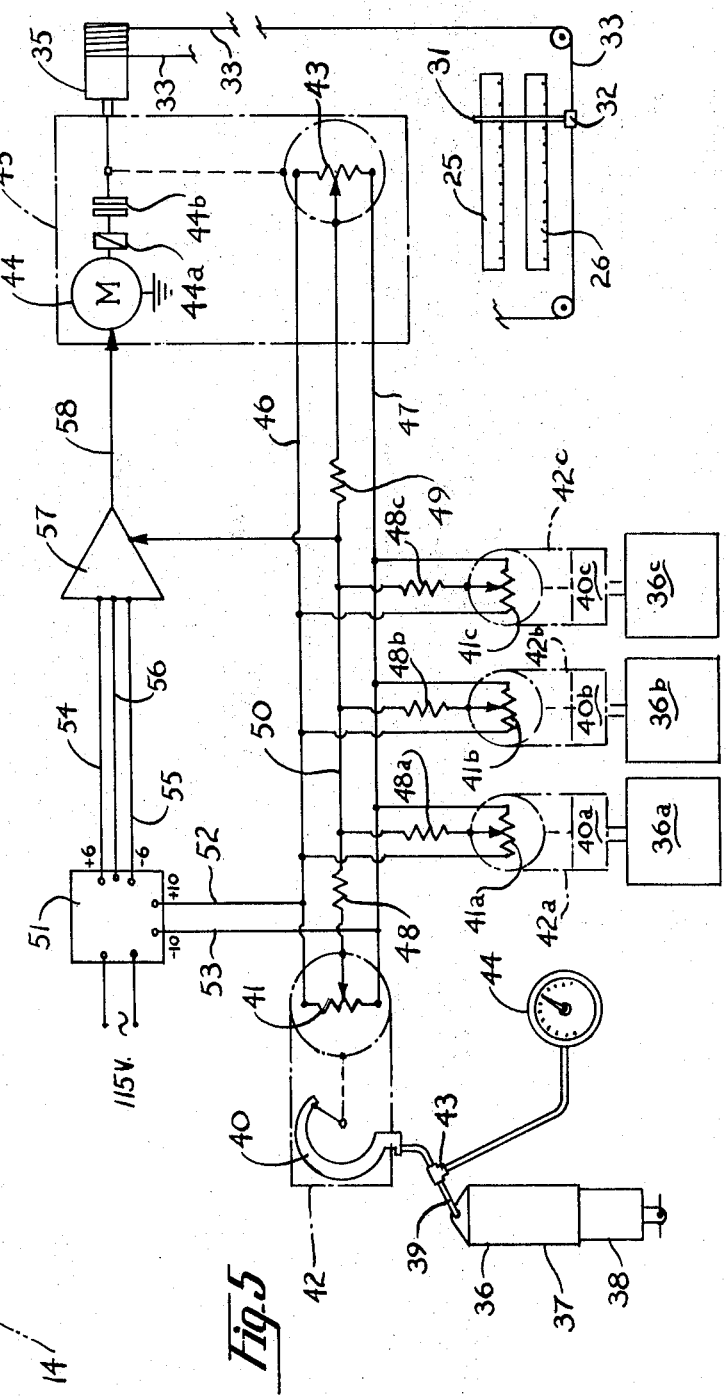

United States Patent Office 3,537,323
Patented Nov. 3, 1970

3,537,323
HOVER-ALTITUDE PERFORMANCE INDICATOR
FOR A HELICOPTER
Richard D. Le Clair, Los Altos, and Clyde Himmelsbach,
San Jose, Calif., assignors to Aerostructures, Inc.,
Menlo Park, Calif., a corporation of California
Filed Sept. 11, 1968, Ser. No. 759,058
Int. Cl. G01c 21/00
U.S. Cl. 73—432                                            20 Claims

ABSTRACT OF THE DISCLOSURE

An analog instrument for a helicopter to relate directly for visual display the contemporary value of the gross weight of such helicopter and corresponding in-ground-effect hover-pressure altitude for any contemporary ambient air temperature. The instrument includes a plurality of pressure transducers respectively associated with the landing gear struts of a helicopter to sense the gross weight thereof and provide electrical indicia representative thereof. Any change in such indicia produces imbalance in a null balance, resistance-type bridge network, and the direction and magnitude of such imbalance is sensed by a servo amplifier which energizes a servo motor in response thereto to change the resistance in one branch of the bridge network and thereby restore the same to balance for the contemporary value of the gross weight of the helicopter.

The mechanical motion of the servo motor required to change the resistance of the bridge network is used to move an indicator along a grass weight scale to a position corresponding to the contemporary value of the gross weight of the helicopter. The indicator also displays along a hover-pressure altitude scale the maximum permissible take off altitude for the helicopter at the corresponding contemporary value of the outside air temperature. Therefore, if the altitude of the takeoff site is less than the permissible maximum altitude displayed by the instrument for any gross weight, the aircraft can be taken off safely, otherwise weight must be removed therefrom. The instrument is provided with a plurality of hover-pressure altitude scales respectively corresponding to various ambient air temperatures, and the pilot mechanically dials into proper display position the altitude scale corresponding to, or most closely approximating, the contemporary ambient or outside air temperature.

---

This invention pertains to a flight performance indicator for a helicopter or the like, and it particularly relates to an instrument for displaying to the pilot of such aircraft the contemporary value of the gross weight thereof and the corresponding in-ground-effect hover-pressure altitude at then prevailing ambient or outside air temperature to advise the pilot as to whether the aircraft can take off.

As is well known, the density or weight per unit volume of atmospheric air at any elevation is inversely related to the temperature thereof, and, in this respect, as air temperature increases and decreases, air density in opposition thereto decreases and increases. Such temperature-density relationship is especially important as concerns operation of certain types of aircraft because it is practicably necessary to maximize the loads carried thereby, and in order for this to be done safely, the weight of any load (actually the gross weight of the aircraft) must be related to the air density because as density decreases, it is more difficult for an aircraft to take off or attain the flight mode thereof which difficulty, in general, necessitates reducing the gross weight of the aircraft as air temperature at take off increases and air density correspondingly decreases.

More particularly, and considering the helicopter as an aircraft in which such relationship is important, each helicopter is capable of sustaining flight at substantially zero translational velocity, assuming certain gross weight conditions are met, and such zero-velocity operation of the aircraft is generally known as the hover mode. Whenever a helicopter hovers relatively close to the ground, the lift supplied by the rotor or rotary wing of the aircraft is supplemented by the proximity of the ground and the aircraft is said to be "in-ground-effect." The flight condition of hovering in-ground-effect is utilized in flying a helicopter and especially during take off thereof.

Further, except in unusual circumstances, the manner in which a helicopter stations attains its flight mode is for the pilot to change the collective pitch (i.e., the fixed or stable pitch of each rotor blade) of the rotary wing until the aircraft rises from the ground and attains some minimum in-ground-effect hover altitude, and upon attainment thereof the pilot then changes the cyclic pitch (i.e., the continuously varying pitch superposed upon the collective pitch of each rotor blade) of the rotary wing to enforce translation flight on the aircraft. Any attempt to shift into translation flight before such minimum hover altitude is attained is attained is considered dangerous and improper flight. By way of illustrating a value of such minimum hover altitude, the helicopter flown by the United States Army under the deisgnation of OH5A is specified to have a minimum in-ground-effect hover altitude of about 2.5 feet.

It may be mentioned that in those cases in which a helicopter is to be taken off from a prepared or flat field so that runway space is afforded, and particularly if the helicopter has a wheel-equipped landing gear, the pilot sometimes can attain auxiliary lift to permit take off when overloaded by taxiing the helicopter along the ground until a forward velocity is atained at which the lift otherwise provided by the rotary wing of the aircraft is augmented sufficiently to enable it to attain a flight mode. This manner of initiating flight is unsual and is generally not feasible where the aircraft is being operated from unprepared fields, rough terrain, or areas of limited size; and, therefore, for purposes hereof it can be properly assumed that unless a helicopter can attain its minimum in-ground-effect hover altitude without first having translational velocity imparted thereto, the aircraft is overloaded and the flight mode can not be attained.

It will be apparent that since the lift that must be produced by the rotary wing of a helicopter in order to raise it to its minimum in-ground-effect hover altitude is directly related to the gross weight of the aircraft, and as the weight thereof increases, the requisite lift increases therewith; and since the amount of lift that can be produced by the rotary wing of a helicopter is directly related to the ambient air density, the lift increasing and decreasing therewith as heretofore stated, it can be concluded that the maximum permissible gross weight of a helicopter for take off purposes is directly related to the density of the air at the time of take off. More explicitly stated, as the air density increases, a heavier load may be carried by the helicopter and vice versa; wherefore the maximum permissible gross weight of a helicopter at take off is dependent upon the contemporary value of the ambient or outside air temperature (density).

All of these relationships are well known, and each helicopter is provided with a flight manual which sets forth these relationships, among others, in a collection of charts or graphs usually denominated "maximum gross weight for hovering." These charts are so organized and compiled that for any ambient or outside air temperature, the pilot can determine the maximum permissible gross weight for the aircraft at which it can attain its minimum in-ground-effect hover mode for the particular altitude of any take off site. Thus, in order to determine whether the helicopter can lift off the ground and reach its minimum in-ground-effect hover mode, the pilot needs to know the outside air temperature, the altitude of the take off site, and the gross weight of the aircraft and then have adequate time to find and correlate the corresponding points on the appropriate charts in his flight manual.

In many instances, the pilot does not have sufficient time to follow such procedure for the purpose of determining whether the aircraft will fly, and this is often the case when the aircraft is being used by the military in combat zones as, for example, to evacuate wounded or other personnel while under enemy fire. Under these same conditions, it might be observed, if a helicopter is overloaded it simply will not lift off, but how much weight must be removed in order for lift off to occur can only be crudely estimated by the pilot and his estimate tested by trying to attain the flight mode after each increment of weight is removed. Obviously, such trial and error techniques are time consuming and are difficult to tolerate under combat conditions.

Accordingly, an object, among others, of the present invention is to provide an improved arrangement for relating the maximum permissible gross weight for a helicopter at any elevation of the take off site thereof to the outside air temperature at such site, and in which visual indicia is continuously available for the pilot so that he can determine at a glance whether the aircraft is overloaded for such outside air temperature and the elevation of the takeoff site. Another object of the invention is that of providing instrumentation supplying the pilot of a helicopter with current information as the aircraft is being loaded as to whether any contemporary weight of the cargo on board exceeds the maximum permissible weight for take off at the ambient temperature and elevation of the take off site.

Still another object is in the provision of instrumentation of the character described which also presents information concerning the difference between any contemporary weight and the permissible maximum weight for take off, so that the pilot can have reliable indicia for estimating the additional weight that can be added to the aircraft without exceeding such permissible maximum weight limitation for the altitude and temperature conditions of the take off site. Yet another object is to provide instrumentation of the type indicated that is operative to correlate any contemporary value of the gross weight of the helicopter, which is automatically supplied, with the in-ground-effect hover performance for any outside air temperature to make available to the pilot information as to whether the aircraft can attain the flight mode.

A further object is in the provision of insrumentation as described in which a plurality of temperature-altitude performance charts are arranged for selective viewing to enable the pilot to choose and dial into position the proper chart for viewing, and in which the only information required by the pilot is the outside air temperature and the altitude of the take off site, each of which is available from standard thermometer and altimeter devices already present in the aircraft. Additional objects and advantages of the invention especially as concerns particular features and characteristics thereof will become apparent as the specification develops.

An embodiment of the invention is illustrated in the accompanying drawings in which:

FIG. 1 is a front view in elevation illustrating the face of an instrument embodying the invention;

FIG. 2 is a side view in elevation of the components located within the instrument casing, which casing is shown in section;

FIG. 3 is a perspective view illustrating the continuous chart and dial therefor comprising a part of the instrument;

FIG. 4 is a top plan view of the component located within the instrument casing, which casing is shown in section; and FIG. 5 is a schematic circuit diagram of the instrument.

FIG. 6 shows details of a plurality of scales used in the indicator of FIGS. 1 to 4.

The instrument as shown in the drawings is denoted in its entirety with the numeral 10, and it includes a casing 11 within which most of the components of the instrument are housed and which casing usually will be located behind the instrument panel of a helicopter (not shown). To facilitate such mounting, the casing is equipped at the forward end thereof with an outwardly extending flange 12 having a plurality of spaced openings adapted to pass screws or other fasteners therethrough to secure such flange, and the casing attached thereto, to the instrument panel of the aircraft. The instrument 10 is provided adjacent the mounting flange 12 with a face 13 along which is presented various indicia for visual observation by the pilot and the controls required by him to operate the instrument, as will be explained hereinafter.

The instrument comprises an endless chart or band 14 entrained about a plurality of rollers 15, there being seven such rollers in the particular embodiment illustrated. It will be evident, especially in FIG. 3, that the band 14 is relatively wide so as to extend substantially across the entire face 13 of the instrument. Accordingly, the rollers 15 are at least as wide as the chart and are journalled for rotation in supports provided therefor by the casing. Each of the rollers 15 is an idler roller, and the chart 14 is moved or driven by drive mechanism that includes a pair of drive sprockets 16 and 17 mounted upon a shaft 18 supported for rotation within the casing 11.

Intermediate the ends of the shaft 18 a drive gear 19 is mounted thereon so as to rotate the same, and a gear 20 in meshing engagement with the gear 19 is mounted upon the inner end of a control shaft 21 extending through the face 13 of the instrument and equipped at its outer end with a control knob 22 disposed along such face for manual manipulation. The teeth projecting radially outwardly from the sprockets 16 and 17 are receivable within openings on apertures disposed in spaced apart relation along the opposite longitudinal edges of the chart 14 so as to form rows 23 and 24 of apertures. Evidently, angular displacement of the control knob 22 in either direction, selectively, will enforce rotation in a corresponding angular direction upon the sprockets 16 and 17 which will cause the chart 14 to move longitudinally so as to align a different set of scales 25 and 26 with the transversely elongated openings or viewing windows 27 and 28 provided in the face 13 of the instrument.

The scales 25 and 26 defining a set thereof will be described in greater detail hereinafter, but as shown by the scale definitions imprinted on the face 13 of the instrument, the scale 25 presents altitude information with the particular scale shown denoting altitude increments varying from about 4,000 feet to 16,000 feet (the number shown multiplied by 1,000). The scale 26 presents gross weight information with the particular scale shown presenting weight information from about 18,000 pounds to 34,000 pounds (the number presented multiplied by 1,000). The scale 25 at one end thereof carries temperature-setting indicia 29 which appears in an opening or viewing window 30 disposed at one end of the window 27. Such temperature information is in degrees centigrade, and the particular scale 25 is for an outside air temperature of 20° C. In adjusting the instrument to the contemporary value of any outside air temperature, the pilot simply rotates the control knob 22 until a temperature-setting figure 29 corresponding to the outside air temperature is presented at the window 30. When this is accomplished, the proper altitude scale 25 and weight scale 26 appear at the respectively associated windows 27 and 28.

Cooperative with the scales 25 and 26 is a needle or indicator 31 which, as shown in FIG. 2, is a unitary or continuous element sufficiently long to extend over both the scales 25 and 26. The needle 31 is vertically oriented and extends upwardly from a mounting block 32 supported along a carrier 33 in the form of a thin cord or cable entrained about a plurality of spaced apart sheaves or pulley wheels 34. As shown in FIG. 4, there are four such pulley wheels, and the cable is seen to be wound about a rotatable drum 35 forming a part of a servo drive that will be explained subsequently. It will be apparent that as the drum 35 rotates in one angular direction, the cable 33 along one side of the drum will be wound thereupon and along the opposite side of the drum the cable will be paid out therefrom with the result that the indicator needle 31 will be transported in one direction across the face 13 of the instrument. Angular rotation of the drum in the opposite direction will cause the cable 33 to be reversely wound onto and paid out from the drum to cause the indicator needle to be transported in the opposite direction across the face 13 of the instrument.

The indicator needle 31 is displaced automatically along the scales 25 and 26 to a position corresponding to any contemporary value of the gross weight of the aircraft, i.e., the sum of the tare weight and the load carried by the aircraft. It may be observed that the tare weight of the helicopter is a known constant contributing only a small amount to the gross weight computation because the aircraft weight is sensed along the landing gear struts, wherefore only the ground-engaging wheels or skids and the lower structural portions of the struts supporting the same contribute to the tare weight of the helicopter for purposes hereof.

To sense the weight, conventional shock absorber structure is used which is located along each landing gear strut. In the particular embodiment of the instrument being considered, the associated helicopter has four such struts, each of which is equipped with a shock absorber. One such shock absorber is shown structurally in FIG. 5 and is denoted with the numeral 36, and it may be an ordinary fluid type shock absorber such as the standard combination oil and air units. Such gaseous fluid defines an air cushion or air spring tending to maintain the telescopically related upper and lower components 37 and 38 of the shock absorber in a predetermined axial orientation. As the weight of the helicopter increases, the components 37 and 38 are moved toward each other into greater telescopic engagement which compresses the gaseous fluid and elevates the pressure thereof.

The gaseous fluid chamber of the shock absorber 36 is connected by a conduit 39 to a pressure responsive sensor 40 which may be a Bourdon tube and is used to control the position of the movable tap of a potentiometer 41. The sensor 40 and potentiometer 41 comprise a pressure transducer generally denoted by the broken lines 42 enclosing such units, and such pressure transducer may be completely conventional. For test purposes, the conduit 39 may be equipped therealong with a fitting 43 to enable a pressure gauge 44 to be connected to the line 39 to observe the pressure therein. The gauge 44, however, is not necessary to the circuitry and operation of the present invention.

The potentiometer 41 comprises a branch of a null balance bridge circuit which includes as another branch thereof a potentiometer 43 forming a component of a servo system that includes a servo motor 44 drivingly connected to the aforementioned drum 35 through a gear reducer 44a and clutch 44b, as shown in FIG. 5. Such servo system, including the potentiometer 43 and motor 44, may be conventional and is denoted in the aggregate by the broken lines generally identified with the numeral 45. The opposite ends of the potentiometers 41 and 43 are directly connected to each other by conductors 46 and 47, respectively. The bridge circuit further includes as branches thereof summing resistances 48 and 49 which are respectively connected to the adjustable taps of the potentiometers 41 and 43 and are serially connected to each other via a line 50.

Electrical power for the bridge circuit is provided by a power supply 51 that may be a regulated supply located externally of the instrument 10, as shown in FIG. 2, and in such event it does not comprise a direct component of the instrument. In an aircraft environment, the input to the power supply 51 generally constitutes a 115-volt alternating current such as provided by an alternator operative to provide a frequency of about 400 cycles per second. The power supply 51 provides in the case of the specific circuit being considered two separate voltage outputs one of which is defined by the lines 52 and 53 which are respectively connected to the conductors 46 and 47, and the other of which is delivered via conductors 54 and 55 and a ground 56 to a servo amplifier 57 operative to sense any imbalance in the bridge circuit and to drive the motor 44 in the appropriate direction to displace the movable tap of the potentiometer 43 toward a condition of circuit balance.

In this respect, the servo amplifier 57 receives as an input thereto the signal information appearing on the line 50 and is operative to sense the direction and magnitude of any change from circuit balance. The output of the amplifier 57 is connected with the motor 44 to control the same, as indicated by the line 58. As stated hereinbefore, the instrument 10 can be used with a helicopter having more than one location for sensing the weight thereof, and in the particular case illustrated the helicopter has four separate landing gear struts each of which supports a component of the weight of the aircraft. Accordingly, that component of the weight present at each such landing gear strut must be sensed by a shock absorber 36 and associated pressure transducer 42, and for purposes of simplification the three additional shock absorbers are diagrammatically depicted by the blocks 36a, 36b and 36c and the pressure transducers by the associated blocks 42a, 42b and 42c. However, to more specifically illustrate the manner in which the additional potentiometers respectively associated with the pressure transducers 42a, 42b and 42c are connected in the bridge circuit, such potentiometers are shown schematically and are respectively denoted 41a, 41b and 41c. It will be observed that the four potentiometers 41 are connected in parallel at their outer ends to the power supply conductors 52 and 53, and that the movable tap of each potentiometer is connected to the conductor 50 through a seperate summing resistance, the three of which are respectively denoted 48a, 48b and 48c.

The circuit illustrated in FIG. 5 will function to continuously adjust the potentiometer 43 to maintain a condition of null balance in the bridge circuit in which no current flows through the conductor 50 connecting the resistances 48 and 49. Accordingly, any position of adjustment of the indicator needle 31 represents the contemporary value of the gross weight of the helicopter because the weight scale 26 and needle movement therealong are calibrated to provide this result. Therefore, when any weight is added to the helicopter as by loading passengers or cargo thereon, the increased weight is sensed by the pressure transducers 42 which shift the positions of the taps of their respectively associated potentiometers 41 to correspond to the changed or then contemporary weight of the helicopter. As a consequence of such change, the bridge circuit will become imbalanced and the magnitude of the resultant imbalance voltage across the sensing potentiometers 41 and conductor 50 is amplified by the servo amplifier 57 which effects energization of the motor 44 in the proper direction to displace the movable tap of the potentiometer 43 toward a position again establishing null balance in the bridge circuit.

Such a displacement of the tap of the potentiometer 43 is accompanied by an associated displacement of the indicator needle 31 to a position representing the new contemporary gross weight of the helicopter, and the scale 26 is calibrated so that gross weight can be read directly by the pilot. This process is continuous so that as each additional piece of cargo is placed abroad the helicopter, the accompanying change in the gross weight is shown by the needle 31. Since the servo amplifier 57 effectively senses any voltage change across the potentiometers 41 and conductor 50, whether in the positive or negative direction, any reduction in the weight of the helicopter is similarly displayed continuously by the indicator needle 31 in association with the weight scale 26.

Since operation of the instrument 10 is dependent upon the gross weight determinations made by the pressure transducers 42 and because such weight is sensed along the struts of the landing gear, the instrument in the form shown is useful only when the aircraft is supported on the ground for otherwise no weight indications can be sensed by the pressure transducers. Therefore, to use the instrument the pilot need only determine the outside or ambient air temperature and the altitude of the field or take off site at which the aircraft is located, which determinations are made by reading the thermometer and altimeter provided as part of the standard instrumentation of the helicopter. The pilot then rotates the control knob 22 until a temperature indication 29 appears at the window 30 that corresponds to, or is the closest value to, the contemporary value of the outside air temperature. Thus, in the case of the adjustment illustrated in FIG. 1 the outside air temperature should be near or very close to 20° C. because that is the temperature indicated by the temperature setting 29 presented at the window 30.

Comparing the two scales 25 and 26 shown in FIG. 1 which respectively depict hover-pressure altitude and gross weight, these scales are inversely ordered so that the gross weight readings increase from left to right and the altitude readings decrease from left to right. Generally, then, it may be concluded that as the altitude of the site from which the helicopter is to lift off is increased, the gross weight that can be carried by the helicopter decreases. There is a direct and specific correlation between the scales 25 and 26 in this respect and, therefore, the position of the indicator needle 31 at any instant provides the pilot with the contemporary value of the gross weight of the vehicle and the corresponding maximum altitude of any site from which lift off can be effected with such gross weight.

Considering the specific scales 25 and 26 and the position of the indicator needle 31 shown in FIG. 1, the pilot knows by inspection of the needle position that the gross weight of the vehicle is approximately 31,200 pounds and that at an outside air temperature of about 20° C. the aircraft can safely lift off the ground if the altitude of the take-off site is not more than 5,000 feet. Therefore, if the aircraft altimeter shows that the elevation of the site is higher than 5,000 feet, 6,000 feet for example, then the gross weight of the helicopter must be decreased by removing passengers and/or cargo therefrom until, assuming such 6,000-foot elevation, the gross weight is not greater than about 30,000 pounds. If, however, the aircraft altimeter shows that the altitude or the elevation of the site is lower than 5,000 feet, 4,000 feet for example, the pilot knows that he can safely lift off and, in fact, can add somewhat more than 800 pounds to the gross weight of the aircraft and still lift off safely.

As indicated hereinbefore, the endless band 14 is provided with a plurality of scales 25 respectively corresponding to different outside air temperatures, and an optimum presentation of altitude scales is believed to be one which provides a separate scale for each two-degree change in temperature. Scale changes in this ratio will keep the instrument readings accurate to within about 100 pounds of gross weight which is believed to be adequate for most environmental uses of a helicopter. Evidently a greater or lesser number of altitude scales can be provided to meet any specialized requirements.

Since the pressure, density and temperature parameters for an ideal gas are interrelated such that $$P_1/p_1T_1 = P_2/p_2T_2 = \text{a constant}$$

if the pressure P is a constant, which it can be taken to be when considering the case of ambient or atmospheric air at any elevation, then the density $p$ must decrease in proportion to any increase in the temperature T, and vice versa. Generally, therefore, as ambient air temperature increases, a helicopter is able to life a smaller load. Inspection of FIG. 6 makes it apparent that the scales 25 representing different ambient temperatures follow such relationships for as the temperature increases, the permissible altitude for lift off decreases for any given gross weight. Thus, at a gross weight of 32,000 pounds, the maximum permissible altitude for lift off is just under 4,000 feet at an outside air temperature of 20° C. (scale 25), but decreases to about 3,200 feet at 22° C. (scale 25'), and to about 2,800 feet at 24° C. (scale 25").

A single fixed gross weight scale 26 might be provided along the face 13 of the instrument because the gross weight of the helicopter remains the same irrespective of the elevation of the take off site thereof. Accordingly, the endless band 14 could contain only hover-pressure altitude scales for each temperature division desired. However, in the instrument 10 being considered, a plurality of weight scales 26 in respective association with the altitude scales 25 are provided along the band 14 which obviates tracking and other alignment problems and any error in scale correspondence that might otherwise be attributable to manufacturing tolerances, and it also permits particular weight ranges to be associated with certain hover-pressure scales.

Essentially there are three variables respectively constituting gross weight, hover-pressure altitude, and temperature and it would appear then that any one of these variables might be taken and displayed as a constant and information concerning the other variables related thereto. Thus, in the foregoing explanation in which it is stated that a single fixed gross weight scale might be used, the gross weight range established thereby would be the constant and the hover-pressure altitude and temperature factors would be the variables related thereto in the display of information. Evidently, arrangements might be provided in which other of the factors would be taken as constants and information then displayed with reference thereto.

In using the instrument, it will be apparent from the foregoing description that the pilot is provided with information by means of which he can continuously estimate the amount of additional weight that may be added to the aircraft or that must be removed therefrom in order to stay within the weight-altitude requirements for safe lift off. For example, and referring to FIG. 1, if the elevation of the take off site is 6,000 feet the pilot knows immediately by glancing downwardly from the 6,000-foot marker on the scale 25 to the aligned marker on the weight scale 26 that the maximum permissible weight at such elevation for the ambient air temperature is 30,000 pounds and that the aircraft is overloaded by 1,200 pounds (three divisions along the weight scale). Therefore, knowing the weight reduction required, the pilot is in a position to accurately estimate the cargo that must be removed; and by way of example, in terms of infantry soldiers, six fully equipped soldiers would have to be removed from the aircraft since the weight of one such soldier is generally taken to approximate 200 pounds.

The instrument 10, as shown in FIG. 1, is ordinarily provided with an on-off switch along the face thereof, and a plurality of jacks may be included along the face for test purposes. Thus, in the particular instrument shown there are four such test jacks by means of which the operating characteristics of the sensors respectively associated with the two front and two rear landing struts can be evaluated. As indicated hereinbefore, the components used in the instrument may be conventional and in this respect, standard servo components can be used such as those sold by the Helipot Division of Beckman Instruments, Inc. of Fullerton, Calif., as, for example, their servo amplifier Model 965 which can be used for the amplifier 57 shown in FIG. 5; Motor-Pot Model 939 for the servo assembly 45; and power supply Model 982 for the power supply 51 heretofore described. Similarly, each of the pressure inducers 42 can be a Bourns Model 312.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. An instrument for correlating contemporary values of the weight of a helicopter and the in-ground-effect hover-pressure altitude therefor to provide information respecting the lift-off capability of the helicopter from a takeoff site at the ambient air temperature thereat, comprising weight sensing apparatus for determining the contemporary value of the weight of such helicopter, chart structure provided with a plurality of hover-pressure altitude scales for such helicopter respectively corresponding to a plurality of ambient air temperatures, means for selectively positioning said scales at an operating station to locate thereat the scale corresponding most closely to the contemporary ambient air temperature at such takeoff site, and an indicator responsive to said sensing apparatus and operative to correlate the contemporary value of the helicopter weight determined thereby with any selected hover-pressure scale to provide intelligence as to whether the helicopter can lift off from the takeoff site at such contemporary weight and ambient temperature conditions.

2. The instrument of claim 1 in which said weight sensing apparatus comprises a transducer operative to convert the contemporary value of the weight sensed thereby into an electric signal, and further comprising circuitry for measuring any change in such signal from one contemporary weight value to another and for providing an output indicative thereof, said indicator being responsive to such output.

3. The instrument of claim 2 in which said circuitry is a null balance bridge circuit characterized by any change in such electrical signal causing an imbalance thereof, and in which said circuitry includes a servo system responsive to any such imbalance and operative to correctively change relative circuit values to restore the condition of null balance, such restoration of balance providing the aforesaid output to which said indicator is responsive.

4. The instrument of claim 2 in which said sensing apparatus comprises a plurality of transducers respectively located along landing gear elements of such helicopter and each determining a component of the weight thereof.

5. The instrument of claim 4 in which said circuitry is a null balance birdge circuit characterized by any change in such electrical signal causing an imbalance thereof, and in which said circuitry includes a servo system responsive to any such imbalance and operative to correctively change relative circuit values to restore the condition of null balance, such restoration of balance providing the aforesaid output to which said indicator is responsive.

6. The instrument of claim 1 and further comprising a weight scale positioned at such operating station and providing in association with said indicator information concerning the contemporary value of the gross weight of the helicopter.

7. The instrument of claim 1 in which said chart structure includes an endless band constrained for longitudinal movement about a fixed path and having said hover-pressure altitude scales disposed thereon in longitudinally spaced relation, and in which said means for selectively positioning said scales at such operating station include mechanism for displacing said band longitudinally to orient any selected scale at such station.

8. The instrument of claim 1 in which such operating station is a display station, and in which each of said hover-pressure altitude scales is graduated into altitude divisions, said indicator being disposed at such display station and being movable in response to said sensing apparatus to a position along the selected hover-pressure scale identifying the maximum permissible elevation of a takeoff site for the helicopter at such contemporary weight and ambient temperature conditions.

9. The instrument of claim 8 in which said weight sensing apparatus comprises a transducer operative to convert the contemporary value of the weight sensed thereby into an electric signal, and further comprising circuitry for measuring any change in such signal from one contemporary weight value to another and for providing an output indicative thereof, said indicator being responsive to such output and thereby responsive to said weight sensing apparatus.

10. The instrument of claim 8 in which said sensing apparatus comprises a plurality of transducers respectively located along landing gear elements of such helicopter and each determining a component of the weight thereof.

11. The instrument of claim 8 in which said chart structure includes an endless band constrained for longitudinal movement about a fixed path and having said hover-pressure altitude scales disposed thereon in longitudinally spaced relation, and in which said means for selectively positioning said scales at such operating station include mechanism for displacing said band longitudinally to orient any selected scale at such station.

12. The instrument of claim 8 and further comprising a weight scale positioned at such display station and providing in association with said indicator information concerning the contemporary value of the gross weight of the helicopter.

13. The instrument of claim 12 in which said weight scale and each of said hover-pressure altitude scales are elongated transversely and are respectively graduated therealong into weight divisions and into the aforesaid altitude divisions, said weight scale and any selected hover-pressure altitude scale being disposed at such display station in spaced apart substantially parallel relation, said indicator being movable along each scale at such display station and at any position thereof identifying both the weight of the helicopter and the corresponding maximum permissible elevation for takeoff at the contemporary ambient air temperature.

14. The instrument of claim 13 in which said weight sensing apparatus comprises a transducer operative to convert the contemporary value of the weight sensed thereby into an electric signal, and further comprising circuitry for measuring any change in such signal from one contemporary weight value to another and for providing an output indicative thereof, said indicator being responsive to such output and thereby responsive to said weight sensing apparatus.

15. The instrument of claim 14 in which said sensing apparatus comprises a plurality of transducers respectively located along landing gear elements of such helicopter and each determining a component of the weight thereof.

16. The instrument of claim 15 in which said chart structure includes an endless band constrained for longitudinal movement about a fixed path and having said hover-pressure altitude scales disposed thereon in longitudinally spaced relation, and in which said means for selectively positioning said scales at such display station include mechanism for displacing said band longitudinally to orient any selected scale at such station.

17. The instrument of claim 16 in which said circuitry is a null balance bridge circuit characterized by any change in such electrical signal causing an imbalance thereof, and in which said circuitry includes a servo system responsive to any such imbalance and operative to correctively change relative circuit values to restore the condition of null balance, such restoration of balance providing the aforesaid output to which said indicator is responsive.

18. The instrument of claim 1 in which said chart structure is further provided with a plurality of weight scales in respective association with said hover-pressure altitude scales for selective positioning therewith at such operating station and providing in association with said indicator information concerning the contemporary value of the gross weight of the helicopter.

19. The instrument of claim 18 in which said chart structure includes an endless band constrained for longitudinal movement about a fixed path and having said hover-pressure altitude scales and weight scales disposed thereon in longitudinally spaced relation, and in which said means for selectively positioning said scales at such operating station include mechanism for displacing said band longitudinally to orient any selected scale at such station.

20. The instrument of claim 19 in which said endless band is provided with temperature indicia in respective association with said hover-pressure altitude scales for identification thereof.

References Cited

UNITED STATES PATENTS

| | | | |
|---|---|---|---|
| 1,855,928 | 4/1932 | Sherer | 177—41 |
| 2,559,718 | 7/1951 | Goodlett et al. | 73—65 |
| 2,735,291 | 2/1956 | Quinn | 73—65 |
| 3,152,248 | 10/1964 | Deschamps. | |
| 3,310,976 | 3/1967 | Bussell et al. | 73—65 |

S. CLEMENT SWISHER, Primary Examiner

U.S. Cl. X.R.

73—178; 177—41